(12) United States Patent
Amtmann et al.

(10) Patent No.: US 7,737,822 B2
(45) Date of Patent: Jun. 15, 2010

(54) METHOD OF RECOGNIZING WHETHER A TRANSPONDER BELONGS TO A GROUP OF TRANSPONDERS

(75) Inventors: Franz Amtmann, Graz (AT); Michael Cernusca, Judendorf-Straßengel (AT); Christian Scherabon, Graz (AT)

(73) Assignee: NXP B.V., Eindhoven (NL)

( * ) Notice: Subject to any disclaimer, the term of this patent is extended or adjusted under 35 U.S.C. 154(b) by 1177 days.

(21) Appl. No.: 10/535,348

(22) PCT Filed: Oct. 31, 2003

(86) PCT No.: PCT/IB03/04906

§ 371 (c)(1),
(2), (4) Date: May 18, 2005

(87) PCT Pub. No.: WO2004/047002

PCT Pub. Date: Jun. 3, 2004

(65) Prior Publication Data

US 2006/0077043 A1    Apr. 13, 2006

(30) Foreign Application Priority Data

Nov. 21, 2002    (EP)    .................................. 02102616

(51) Int. Cl.
*H04Q 5/22*    (2006.01)

(52) U.S. Cl. .............. 340/10.32; 340/10.42; 340/10.33; 340/7.44
(58) Field of Classification Search ................ 340/10.2, 340/10.1, 10.32, 10.42, 7.44, 505, 572.4, 340/572.1; 714/6; 342/77
See application file for complete search history.

(56) References Cited

U.S. PATENT DOCUMENTS 5,673,037 A * 9/1997 Cesar et al. ............... 340/10.32
5,818,348 A * 10/1998 Walczak et al. ............ 340/10.3
6,150,921 A * 11/2000 Werb et al. ................. 340/10.1

FOREIGN PATENT DOCUMENTS

EP    0805575    * 5/1997

* cited by examiner

*Primary Examiner*—Vernal U Brown

(57) ABSTRACT

A method recognizes whether a transponder designed for communicating with a communication station belongs to one of at least two groups of transponders. First, for each group of transponders, a check data block that is significant for the group of transponders is generated. Then, the data from the check data block that is significant for the group of transponders is evaluated for the recognition of whether the transponder belongs to the group of transponders.

15 Claims, 3 Drawing Sheets

METHOD OF RECOGNIZING WHETHER A TRANSPONDER BELONGS TO A GROUP OF TRANSPONDERS

The invention relates to a method of recognizing whether a transponder designed for communicating with a communication station belongs to one of at least two groups of transponders, under which method the communication station designed for communicating with the transponder sends a request signal to the transponder, which request signal comprises a command data block and a check data block, and under which method, data contained in the request signal is evaluated in the transponder in order to recognize whether the transponder belongs to a group of transponders.

The invention further relates to a communication station for communicating with a transponder, which transponder belongs to one of at least two groups of transponders.

The invention further relates to a circuit for a communication station for communicating with a transponder, which transponder belongs to one of at least two groups of transponders.

The invention further relates to a transponder for communicating with a communication station, which transponder belongs to one of at least two groups of transponders.

The invention further relates to a circuit for a transponder for communicating with a communication station, which transponder belongs to one of at least two groups of transponders.

A method of this kind and a communication station of this kind and a circuit of this kind for a communication station and a transponder of this kind and a circuit of this kind for a transponder have been published in the form of Standard ISO 15693, and are therefore known.

In the case of the known solution, a request signal, by which a group of transponders can be addressed and which is therefore designated a group request signal, comprises a command data block and a check data block, wherein the command data block comprises a command section and a parameter section. Provided hereby in the parameter section of the group request signal is a separate data block, which is designated an AFI data lock and which comprises a total of 8 bits, i.e. one byte, and which is significantly selected and designed for each group of transponders. The abbreviation AFI stands for Application Field Identifier. The AFI data block is generated in the known communication station and transmitted to the known transponders present in a communication area of the known communication station, and evaluated in these transponders. Although a good recognition of whether a transponder designed to communicate with a communication station belongs to one of at least two groups of transponders is ensured with the known solution, the known solution has the disadvantage that a separate data block, namely the AFI data block is necessary in the parameter section of the group request signal in order to enable a recognition of whether a transponder belongs to a group of transponders. For its transmission from the communication station to the transponders, a separate AFI data block of this kind unfortunately requires an additional transmission time interval and, in addition, a separate AFI data block of this kind has disadvantageous influences on the transmission frequency spectrum, so it has transpired that the known solution is in need of improvement.

It is an object of the invention to improve the known method, which is in need of improvement, i.e. to eliminate the disadvantages occurring in the application of this method, and to realize an improved method and an improved communication station and an improved circuit for a communication station and an improved transponder and an improved circuit for a transponder.

To achieve the above-mentioned object, features in accordance with the invention are provided in a method in accordance with the invention, so a method in accordance with the invention can be characterized in the following manner, namely:

A method of recognizing whether a transponder designed for communicating with a communication station belongs to one of at least two groups of transponders, under which method the communication station designed for communicating with the transponder delivers a request signal to the transponder, which request signal comprises a command data block and a check data block, and under which method, data contained in the request signal is evaluated in the transponder in order to recognize whether the transponder belongs to a group of transponders, wherein, for each group of transponders, a check data block that is significant for the group of transponders is generated, and wherein the data that is evaluated for the recognition of whether the transponder belongs to a group of transponders is data from the check data block that is significant for the group of transponders.

To achieve the above-mentioned object, features in accordance with the invention are provided in a communication station in accordance with the invention, so a communication device in accordance with the invention can be characterized in the following manner, namely:

A communication station for communicating with a transponder, which transponder belongs to one of at least two groups of transponders, wherein the communication station contains means for implementing the method in accordance with the invention.

To achieve the above-mentioned object, features in accordance with the invention are provided in a circuit in accordance with the invention provided for a communication station, so a circuit of this kind in accordance with the invention can be characterized in the following manner, namely:

A circuit for a communication station for communicating with a transponder, which transponder belongs to one of at least two groups of transponders, wherein the circuit contains means for implementing the method in accordance with the invention.

To achieve the above-mentioned object, features in accordance with the invention are provided in a transponder in accordance with the invention, so a transponder in accordance with the invention can be characterized in the following manner, namely:

A transponder for communicating with a communication station, which transponder belongs to one of at least two groups of transponders, wherein the transponder contains means for implementing the method in accordance with the invention.

To achieve the above-mentioned object, features in accordance with the invention are provided in a circuit in accordance with the invention provided for a transponder, so a circuit of this kind in accordance with the invention can be characterized in the following manner, namely:

A circuit for a transponder for communicating with a communication station, which transponder belongs to one of at least two groups of transponders, wherein the circuit contains means for implementing the method in accordance with the invention.

Through the provision of the features in accordance with the invention it is achieved that, in order to recognize whether a transponder designed for communicating with a communication station belongs to one of at least two groups of transponders, data contained in a check data block that is significant for a group of transponders is used, which gives rise to the advantage that no separate data has to be transmitted for the purpose of recognition, since a check data block of this kind has to be used anyway, and therefore has to be provided and transmitted in any event, as a result of which transmission time can be saved as compared with the known solution, and fewer energy-rich sidebands occur in the transmission frequency spectrum.

In the case of a method in accordance with the invention, a check data block generated by a so-called parity bit method may be selected and transmitted as the check data block. It has, however, proved especially advantageous if a CRC data block is selected as the check data block. A CRC data block of this kind offers the advantage of a very high degree of security against transmission errors, and the advantage that any transmission error occurring despite the high degree of security against transmission errors can be detected and, in some cases, even corrected.

In the case of a communication station in accordance with the invention and in the case of a circuit in accordance with the invention for a communication station, it has proved advantageous if, in addition, the features as claimed in claim 4 and in claim 6 respectively are provided. A design of this kind has proved especially advantageous since, with this design, a very simple realization is enabled in the communication station and in the circuit for a communication station respectively.

In the case of a transponder in accordance with the invention and in the case of a circuit in accordance with the invention for a transponder, it has proved extremely advantageous if, in addition, the features as claimed in claim 8 and in claim 11 respectively are provided. A design of this kind has proved especially advantageous since, with this design, a very simple realization is enabled in the transponder and in the circuit for a transponder respectively, which circuit is realized as an integrated circuit, in the case of which only a very small surface area is needed for the realization of the features in question here.

In the case of a transponder in accordance with the invention and in the case of a circuit in accordance with the invention for a transponder, as cited in the paragraph above, it has proved extremely advantageous if the start-value memory means are designed to store at least two different start values, and if means for sending one start value selected from the at least two start values to the CRC-data-block generation means are provided. As a result, it is possible, in an extremely simple manner, to select a start value either during a test procedure that concludes the production of the circuit for the transponder and is undertaken at the premises of the manufacturer of the circuit and at the premises of the manufacturer of the transponder, or during a programming procedure that concludes the production of the transponder. It should also be mentioned that the start-value memory means may take the form of a part of a semiconductor memory that is anyway provided in the transponder. The start-value memory means may, however, also be formed by metallization layers that are anyway present in an integrated circuit of the transponder, i.e. may take the form of memory means realized in terms of hardware, wherein a control bit that can be set in the integrated circuit can be set for selection of a start value stored by the metallization layers, so the particular start value desired has then been activated in the transponder.

The above aspects and further aspects of the invention are explained below.

The invention will be further described with reference to an example of an embodiment shown in the drawings, to which, however, the invention is not restricted.

Figure 1:
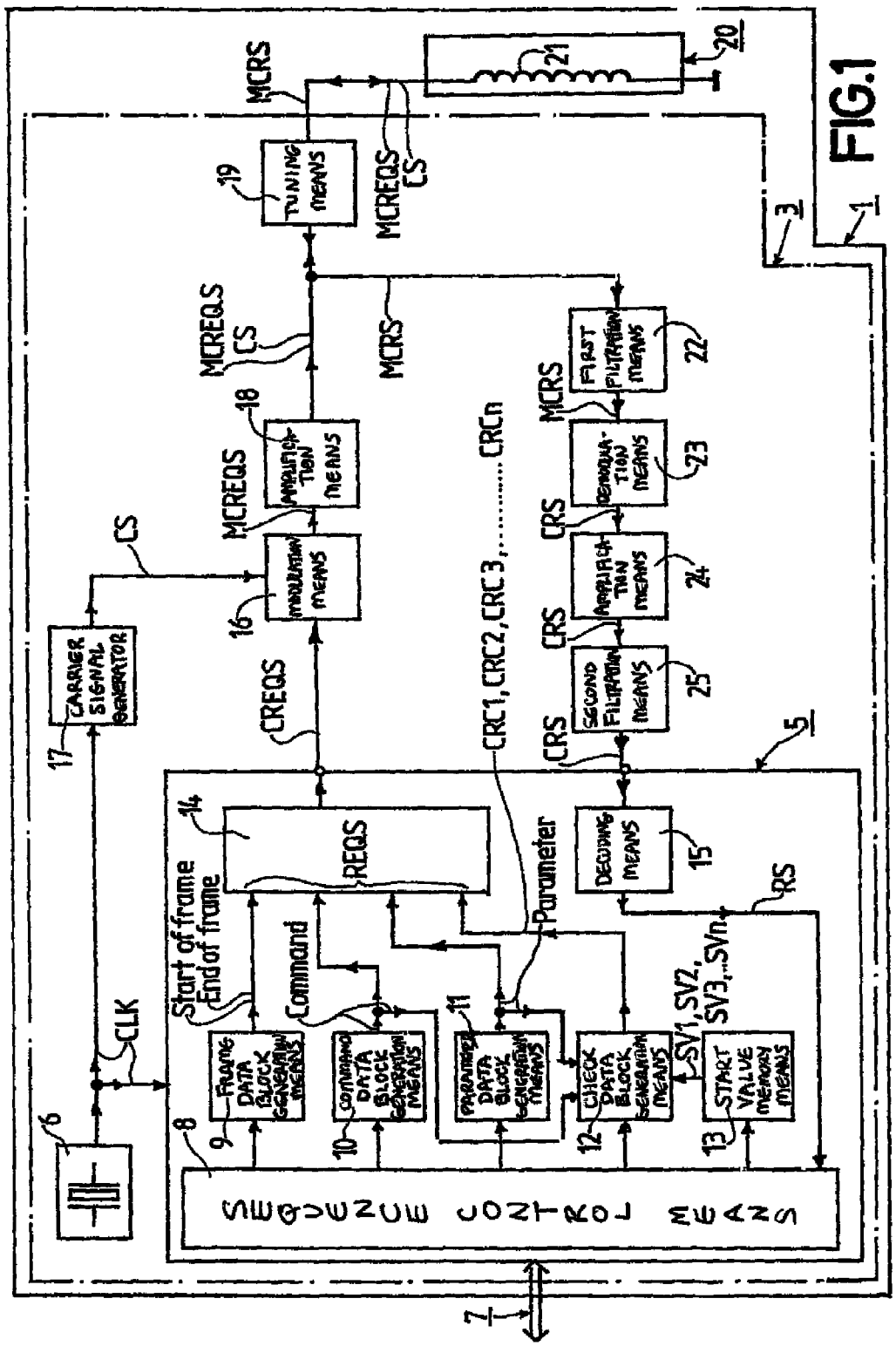
FIG. 1 shows, in a schematic manner, in the form of a block diagram, a part of a communication station in accordance with one embodiment of the invention that is significant in the present context, which communication station contains an integrated circuit in accordance with one embodiment of the invention.
Figure 2:
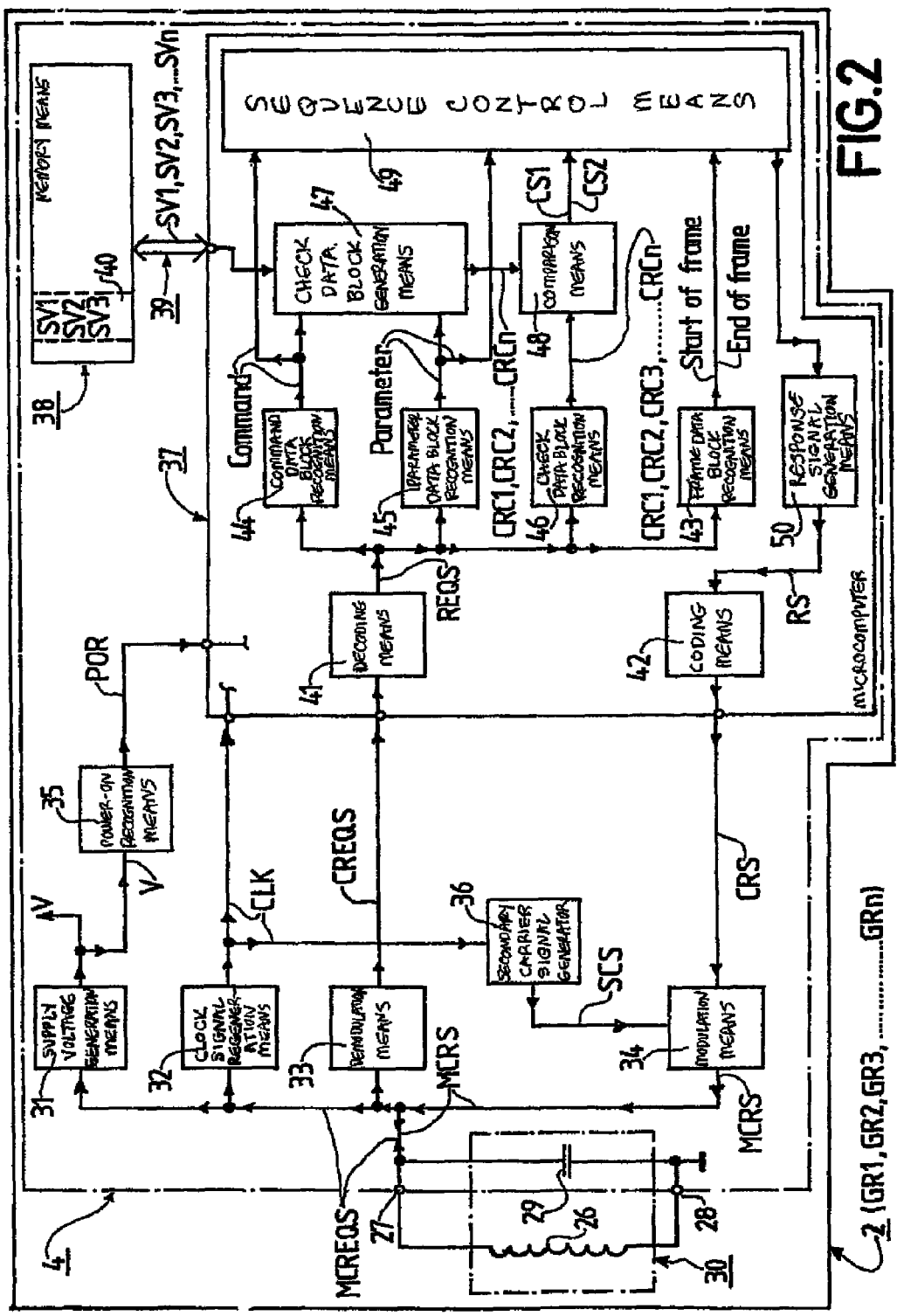
FIG. 2 shows, in a schematic manner, in the form of a block diagram, a part of a transponder in accordance with one embodiment of the invention that is significant in the present context, which transponder contains an integrated circuit in accordance with the invention.

FIG. 1 shows a communication station 1 and FIG. 2 shows a transponder 2. Communication station 1 contains a circuit 3, which is realized as an integrated circuit, which, however, does not necessarily have to be the case. Transponder 2 contains an integrated circuit 4. Communication station 1 and transponder 2 are designed for contactless communication with one another. In normal application cases, a plurality of transponders 2 can intercommunicate with communication station 1, wherein transponders 2 are located in a communication area of communication station 1. Transponders 2 are hereby divided into different groups of transponders 2, wherein this subdivision may have taken account of the most diverse aspects. For example, a division of products that may be purchased in a food supermarket may be made according to article numbers and according to prices. Division may also take place according to different article types, e.g. cosmetic items, beverages, bakery products and vegetables, wherein four groups of transponders will then be present. A division into standard-compliant transponders—e.g. in accordance with Standard ISO 15693 —and non standard-compliant transponders may also be made. Before the reading of data contained in each of transponders 2 or the writing of data into each of transponders 2 can take place, a so-called inventorization of the plurality of transponders 2 has to be undertaken by communication station 1, which communicates with transponders 2 in a contactless manner. In the course of an inventorization of this kind, significant identification data relating to the particular transponder 2 is transmitted from the particular transponder 2 to communication station 1 for each transponder 2, and is stored in communication station 1 so that the identification data for all transponders 2 that can intercommunicate with communication station 1 is known in communication station 1, as a result of which it is enabled that, using the identification data significant for a transponder 2, communication station 1 can enter into intercommunication with the transponder 2 concerned in a targeted, non-confusable manner, in order, for example, to read useful data from the transponder 2 concerned or to read useful data into the transponder 2 concerned. Before an inventorization of this kind of the plurality of transponders 2 takes place, recognition must also take place of whether a transponder 2 belongs to a particular group of transponders 2. This recognition will be further described below.

Communication station 1 contains a microcomputer 5. A hard-wired logic circuit may also be provided instead of microcomputer 5. Communication station 1 further contains a quartz oscillator 6, by means of which a clock signal CLK can be generated, which clock signal CLK is sent to microcomputer 5. Microcomputer 5 is connected via a BUS connection 7 to a HOST computer, which is not shown in FIG. 1, in order that data exchange can take place between the HOST computer and microcomputer 5. Using microcomputer 5, a plurality of means and functions are realized, of which, however, only those means and functions that are significant in the present context are described in greater detail here.

Microcomputer 5 contains sequence control means 8, by which the sequences that can be implemented in microcomputer 5 can be controlled. Microcomputer 5 further contains frame-data-block generation means 9 and command-data-block generation means 10 and parameter-data-block generation means 11 and check-data-block generation means 12 and start-value memory means 13 and coding means 14 and decoding means 15. Microcomputer 5 also contains a series of further command generation means and signal generation means and command recognition means and signal recognition means, which are, however, not described in greater detail here.

Figure 3:
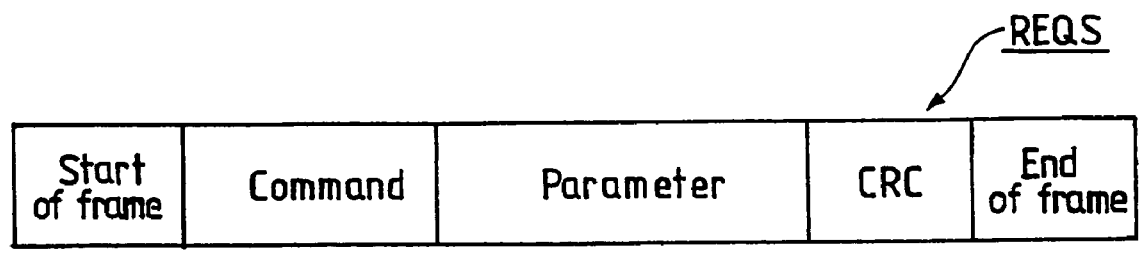
FIG. 3 shows, in a schematic manner the configuration of a request signal that is transmitted from communication station 1 in accordance with FIG. 1 to a transponder in accordance with FIG. 2 in the course of a method in accordance with the invention.

FIG. 3 shows schematically the structure of a request signal REQS. As can be seen in FIG. 3, a request signal REQS comprises a "start of frame" data block and a "command" data block and a "parameter" data block and a "CRC" check data block, which is a so-called CRC checksum data block, and an "end of frame" data block. All other command signals exhibit, at least essentially, the same structure. The start data block identifies the beginning of the particular command signal. The command data block identifies the particular command directed at at least one transponder 2, e.g. one of the commands "respond", "write", "read", "delete" etc. The parameter data block identifies additional information relating to a command, e.g. the additional information "all data starting at memory location xy up to and including memory location yz" relating to the command "read". The CRC checksum data block identifies a checksum whose generation is described below. The end data block identifies the end of the particular command signal.

The frame-data-block generation means 9 serves for generating the two frame data blocks, namely the "start of frame" data block and the "end of frame" data block. The command-data-block generation means 10 serves for generating the "command" data block.

The parameter-data-block generation means 11 serves for generating the "parameter" data block. The check-data-block generation means 12 serves for generating the check data block, i.e. the CRC checksum data block.

The start-value memory means 13 is of programmable design and serves for storing a first start value SV1 and a second start value SV2 and a third start value SV3, wherein each of these three start values SV1, SV2, SV3 is selected from a group of start values SV1, SV2, SV3, . . . SVn, and is, in each case, assigned to a group GR1, GR2, GR3, . . . GRn of transponders 2. In the present case, it is assumed that only the first start value SV1 has been stored in the start-value memory means 13 and has been sent to the start-value memory means 13 by the HOST computer via the BUS connection 7 and the sequence control means 8. More than just one start value may also be stored in start-value memory means 13, e.g. two, three, four or even more, wherein, using suitable means, preferably using the sequence control means 8, a different start value may be activated in each case, wherein the start value activated in the particular case is sent to the check-data-block generation means 12.

Each start value SV1, SV2, SV3 . . . SVn is hereby assigned to a group GR1, GR2, GR3 . . . GRn of transponders 2, which has the result that, depending on the particular start value activated, a CRC checksum data block CRC1, CRC2, CRC3, . . . CRCn that is significant for the assigned group GR1, GR2, GR3, . . . GRn of transponders 2 is generated. This also applies, of course, if just one single start value is stored in the start-value memory means 13, since then, corresponding with this start value, a CRC checksum data block that is significant for a group of transponders 2 will be generated. The various start values SV1, SV2, SV3 . . . SVn are therefore responsible for the generation of different CRC checksum data blocks CRC1, CRC2, CRC3, . . . CRCn, of which different CRC checksum data blocks CRC1, CRC2, CRC3, . . . CRCn, each CRC checksum data block CRC1, CRC2, CRC3, . . . CRCn is significant for a group GR1, GR2, GR3, . . . GRn of transponders 2.

The coding means 14 serves for coding the commands and signals sent to it, and thereby also for coding the frame data blocks and the command data block and the parameter data block and the check data block, i.e. the entire request signal REQS, for example. Following the coding of the request signal REQS sent to it, the coding means 14 delivers a, coded request signal CREQS. Decoding means 15 serves for decoding coded signals sent to it, e.g. a coded response signal CRS. Following the decoding, decoding means 15 delivers the decoded signals, e.g. the decoded response signal RS.

The following should be mentioned with regard to check-data-block generation means 12. The "command" data block and the "parameter" data block and a start value SV1, SV2, SV3, . . . SVn are sent to the check-data block generation means 12. The "command" data block and the associated "parameter" data block are subjected to processing by a stipulated algorithm, wherein the algorithm used is influenced by the start value SV1, SV2, SV3, . . . SVn, so the CRC checksum data block CRC1, CRC2, CRC3, . . . CRCn obtained as the result of the processing of the "command" data block and the "parameter" data block is dependent on the start value SV1, SV2, SV3, . . . SVn. In other words, this means that, in the event that the first start value SV1 is stored in the start-value memory means 13, a first CRC checksum data block CRC1 that is significant for a first group GR1 of transponders 2 is obtained. In the event that a different start value, e.g. a second start value SV2 or a third start value SV3, is stored in start-value memory means 13, a different CRC checksum data block is obtained, namely a second CRC checksum data block CRC2 or a third CRC checksum data block CRC3. The second CRC checksum data block CRC2 is significant for a second group GR2 of transponders 2. The third CRC checksum data block CRC3 is significant for a third group GR3 of transponders 2. It should be mentioned that the generation of a CRC checksum data-block of this kind has already been known for a long time, for which reason no further details will be given here.

Communication station 1 further contains modulation means 16, to which the coded request signal CREQS generated by coding means 15 can be sent, and to which, in addition, a carrier signal CS can be sent. For generation of the carrier signal CS, communication station 1 contains a carrier-signal generator 17, to which clock signal CLK can be sent from quartz oscillator 6, and which generates the carrier signal CS using clock signal CLK. The carrier signal CS can be modulated by modulation means 16, using the supplied coded request signal CREQS, wherein, following a modulation, modulation means 16 delivers a modulated, coded request signal MCREQS. The modulated, coded request signal MCREQS can be sent to first amplification means 18, which deals with the amplification of the modulated, coded request signal MCREQS. The mentioned modulation of the unmodulated carrier signal CS using the coded request signal CREQS takes place in the case of the desired transmission of commands from communication station 1 to the transponders 2. In the case of a desired transmission of signals from the transponders 2 to communication station 1, the unmodulated carrier signal CS, generated by carrier-signal generator 17, is passed on from modulation means 16 to the first amplification means 18 in an unmodulated manner. Both the modulated, coded request signal MCREQS and the unmodulated carrier signal CS can be sent from the amplification means 18 to tuning means 19, which tuning means 19 passes the modulated, coded request signal MCREQS and the carrier signal CS sent to it on to station transmission means 20, which, in the present case, comprises a transmission coil 21. The transmission coil 21 is provided for inductive, i.e. transformer, coupling with transmission coils of transponders 2. Instead of the transmission coil 21, the station transmission means 20 may also be equipped with a dipole for transmission. Instead of the station transmission means 20 with a transmission coil 21 or a dipole, a station transmission means that operates in a capacitive manner or an optical manner may also be provided.

The station transmission means 20 serves not only for transmitting commands and signals from communication station 1 to the transponders 2 present in the communication area of communication station 1, but also for receiving signals to be transmitted from the transponders 2 in question to communication station 1. For instance, response signals RS are to be transmitted from the transponders 2 to communication station 1. The transmission of these response signals RS takes place in such a manner that the response signals RS are coded and modulated, so that modulated, coded response signals MCRS are received by means of station transmission means 20. The received modulated, coded response signals MCRS are sent from station transmission means 20 via tuning means 19 to first filtration means 22, which filters out interference components and which delivers modulated, coded response signals MCRS, free from interference, to demodulation means 23. Demodulation means 23 is designed to demodulate the modulated, coded response signals MCRS sent to it. Following a demodulation of the modulated, coded response signals MCRS, demodulation means 23 sends coded response signals CRS to second amplification means 24, which amplifies the coded response signals CRS sent to it. Connected downstream of second amplification means 24 is second filtration means 25, which undertakes a further filtration and which, following the filtration, sends the coded response signals CRS to decoding means 15.

As already mentioned, communication station 1 is provided and designed for contactless communication with a plurality of transponders 2. All transponders 2 are of the same design, which is described below with reference to the transponder 2 shown in FIG. 2.

In addition to the integrated circuit 4, transponder 2 contains a transmission coil 26, which is connected to a first port 27 and a second port 28 of integrated circuit 4. By means of transmission coil 26, transponder 2 can communicate with communication station 1 in a contactless manner via transmission coil 21 of communication station 1. Connected in parallel with transmission coil 26 is a capacitor 29, contained in integrated circuit 4. Transmission coil 26 and capacitor 29 form an oscillating circuit, which is tuned to a working frequency and which is a constituent part of transponder transmission means 30. Instead of transmission coil 26, transponder transmission means 30 may also be equipped with a dipole for transmission. Instead of transponder transmission means 30 with a transmission coil 26 or a dipole, a transponder transmission means that operates in a capacitive manner or an optical manner may also be provided.

The integrated circuit 4 of transponder 2, and consequently of the transponders 2, contains supply-voltage generation means 31 and clock-signal regeneration means 32 and demodulation means 33 and modulation means 34. These four means, 31, 32, 33 and 34, are each connected to the transponder transmission means 30.

The supply-voltage generation means 31 serves for generating a supply voltage V using the signals delivered from transponder transmission means 30, i.e. using the modulated, coded request signal MCREQS or the unmodulated carrier signal CS, for example. The supply voltage V that can be generated by supply-voltage generation means 31 can be sent to all those components of integrated circuit 4 that require this supply voltage V, which, however, is not shown separately in FIG. 2. Connected to supply-voltage generation means 31 is "power on" recognition means 35, to which the output signal of supply-voltage generation means 31, i.e. the particular supply voltage V generated, can be sent. It can be recognized, by "power on" recognition means 35, whether a sufficiently high supply voltage V is available. If a sufficiently high supply voltage V of this kind is available, the "power on" recognition means 35 delivers a so-called "power on" reset signal POR.

The clock-signal regeneration means 32 serves for regenerating a clock signal CLK using the signals delivered from transponder transmission means 30, i.e. using the modulated, coded request signal MCREQS or the unmodulated carrier signal CS, for example. Clock-signal regeneration means 32 delivers clock signal CLK. Instead of clock-signal regeneration means 32, an internal oscillator that is independent of the signals delivered from transponder transmission means 30, by which a clock signal CLK can be generated, may also be provided. An internal oscillator of this kind is advantageous especially if the communication between a communication station and a transponder takes place at an extremely high working frequency, e.g. at working frequencies in the so-called UHF range or the microwave range.

The demodulation means 33 serves for demodulating commands and signals sent to it, i.e. for demodulating the modulated, coded request signal MCREQS, for example. Following a demodulation of the modulated, coded request signal MCREQS, demodulation means 34 delivers the coded request signal CREQS.

The modulation means 34 serves for modulating signals, e.g. for modulating coded response signal CRS that can be sent to modulation means 34. A secondary carrier signal SCS can also be sent to modulation means 34. In order to generate secondary carrier signal SCS, a secondary-carrier-signal generator 36 is provided, to which clock signal CLK can be sent from clock-signal regeneration means 32, and which generates secondary carrier signal SCS using clock signal CLK. In the event of a modulation being undertaken, secondary carrier signal SCS is modulated as a function of, for instance, the coded response signal CRS, by modulation means 34, so that, as a result, modulation means 34 delivers modulated, coded response signals MCRS, which are subsequently transmitted to communication station 1 by transponder transmission means 30 and, hereby, especially by transmission coil 26.

Integrated circuit 4 of transponder 2, and consequently of the transponders 2, contains a microcomputer 37. Instead of microcomputer 37, a hard-wired logic circuit may also be provided. Using microcomputer 37, a number of means and functions are realized, of which, however, only those means and functions that are significant in the present context are described in greater detail here. The "power on" reset signal POR and the clock signal CLK can be sent to microcomputer 37 for purposes that have long been known in expert circles.

Integrated circuit 4 further contains memory means 38, which is connected to microcomputer 37 via a connection 39. Memory means 38 comprises a plurality of memory areas, of which only one memory area 40 is indicated by broken lines, which memory area 40 is provided as a programmable start-value memory means 40. Stored in programmable start-value memory means 40 as the result of a programming sequence undertaken during a test procedure for testing integrated circuit 4 are three start values, each of which is significant for a group GR1, GR2 and GR3 of transponders 2, namely, in this case, the first start value SV1 and the second start value SV2 and the third start value SV3. Stored in memory means 38 are a number of further items of data, which, however, are not described in greater detail here. In the case described here, of the three start values SV1, SV2 and SV3 that have been programmed in and consequently stored, only the first start value SV1 is used, as described in greater detail below.

Decoding means 41 and coding means 42 are realized using microcomputer 37. Decoding means 41 is provided for decoding commands and signals sent to it, i.e. for decoding coded request signal CREQS. Following decoding of coded request signal CREQS, decoding means 41 delivers the decoded request signal REQS, i.e. the frame data blocks and the command data block and the parameter data block and the check data block. Coding means 42 serves for coding signals, e.g. for coding response signal RS. Following a coding of response signal RS, coding means 42 delivers a coded response signal CRS.

Further realized by microcomputer 37 are frame-data-block recognition means 43 and command-data-block recognition means 44 and parameter-data-block recognition means 45 and check-data-block recognition means 46 and check-data-block generation means 47 and comparison means 48. The functions of means 43, 44, 45, 46, 47 and 48 are described below. Microcomputer 37 further contains sequence control means 49, by which the sequences that can be implemented in microcomputer 37 can be controlled.

Frame-data-block recognition means 43 is designed to recognize the "start of frame" data block and the "end of frame" data block. Frame-data-block recognition means 43 delivers both the "start of frame" data block and the "end of frame" data block to the sequence control means 49, as a result of which sequence control means 49 is informed of the beginning and end of a command signal, i.e. also of request signal REQS.

Command-data-block recognition means 44 is provided and designed to recognize "command" data blocks. The "command" data block of request signal REQS is thereby also recognized by command-data-block recognition means 44. The recognized "command" data block of request signal REQS is sent to the sequence control means 49 and further to check-data-block generation means 47 of transponder 2.

Parameter-data-block recognition means 45 is provided and designed to recognize "parameter" data blocks of command signals, i.e. to recognize the "parameter" data block of request signal REQS. The recognized "parameter" data block is likewise sent to the sequence control means 49 and further to check-data-block generation means 47 of transponder 2.

Check-data-block recognition means 46 is provided and designed to recognize the check data block generated by communication station I and received by transponder 2, i.e. the CRC checksum data block. In the present case, the first CRC checksum data block CRC1 is recognized and sent to comparison means 48.

Check-data-block generation means 47 is provided and designed to generate a check data block, i.e. the first CRC checksum data block CRC1 in the present case. As regards its operating principle, check-data-block generation means 47 is the same as check-data-block generation means 12 of communication station 1 in that it undertakes a generation of the check data block, in this case the first CRC checksum data block CRC 1, on the basis of a stipulated algorithm, and uses for this purpose the "command" data block sent to it and the "parameter" data block sent to it and the start value sent to it, i.e. in this case the first start value SV1, which is stored in start-value memory means 40. In order to send the first start value SV1 to check-data-block generation means 47, means are provided, namely sequence control means 49, to send the first start value SV1 via a connection 39 to check-data-block generation means 47. The first CRC checksum data block CRC1 generated by check-data-block generation means 47 is sent to comparison means 48.

Comparison means 48 serves for comparing the CRC checksum data block delivered by check-data-block recognition means 46 (i.e. the first CRC checksum data block CRC1 in the present case) and the CRC checksum data block generated by check-data-block generation means 47 (i.e. the first CRC checksum data block CRC1 in the present case). If the two CRC checksum data blocks sent to comparison means 48 coincide, comparison means 48 delivers a first control signal CS1. If, conversely, the two CRC checksum data blocks sent to comparison means 48 do not coincide, comparison means 48 delivers a second control signal CS2. Both the first control signal CS1 and the second control signal CS2 are sent to sequence control means 49. In the event of the occurrence of first control signal CS1, sequence control means 49 ensures that transponder 2 undertakes further communication steps with communication station 1, i.e. a read procedure or a write procedure or a delete procedure, for example. In the event of the occurrence of second control signal CS2, sequence control means 49 ensures that transponder 2 does not react at all to the received request signal REQS, i.e. that transponder 2 is automatically taken out of its communication function.

In a further communication step of this kind, it may be that sequence control means 49 ensures that response-signal generation means 50, realized by microcomputer 37, generates the above-mentioned response signal RS, which is subsequently coded by coding means 42 and modulated by modulation means 34, so the modulated, coded response signal MCRS is transmitted, by transponder transmission means 30, to station transmission means 20 of communication station 1, and consequently to communication station 1.

Instead of the procedure described above, in which procedure the first CRC checksum data block CRC1 is formed by check-data-block generation means 47 using the "command" data block and the "parameter" data block and the first start value SV1 selected in this case, and subsequently a comparison is undertaken of the formed CRC checksum data block CRC1 with the CRC checksum data block CRC1 delivered by communication station 1 and received by transponder 2, the so-called residue method may also be implemented. Under this residue method, the "command" data block received by transponder 2 and the "parameter" data block received by transponder 2 and the first start value SV1 are sent to check-data-block generation means 47 and processed with check-data-block generation means 47, wherein, following this processing, the CRC checksum data block CRC1 transmitted from communication station 1 to transponder 2 is also sent to check-data-block generation means 47 and processed with check-data-block generation means 47. During this latter processing, a so-called residue is formed by check-data-block generation means 47, which residue is a fixed data value, which is compared with a stipulated residue, i.e. a stipulated fixed data value, wherein, in the case of equivalence of the two residues, it is recognized that transponder 2 belongs to a stipulated desired group GR1 of transponders 2. The value of the residue is hereby dependent on a start value.

As already mentioned above, before any communication is undertaken between communication station 1 and transponder 2, it must be established or recognized whether a transponder 2 belongs to a group GR1, GR2, GR3 . . . GRn of transponders 2. A method for recognizing whether the transponder 2 designed to communicate with communication station 1 belongs to a first group GR1 of transponders 2 is described below.

Before the method is implemented, in the example assumed here, the first start value SV1 is written to start-value memory means 13 of communication station 1, so the first start value SV1 is stored in start-value memory means 13. The writing of the first start value SV1 takes place via BUS connection 7 using a HOST computer that is capable of communicating with communication station 1, specifically with circuit 3 for communication station 1.

Before the actual implementation of the method, it is ensured in transponder 2, specifically in integrated circuit 4 of transponder 2, that, when the method is implemented, the first start value SV1 is read from start-value memory means 40 by sequence control means 49 and sent via connection 39 to check-data-block generation means 47. This means that transponder 2 belongs to the first group GR1 of transponders 2, the reason being that the first start value SV1 has been activated.

Communication station 1 generates, regularly in succession, request signal REQS, the configuration of which is shown in FIG. 3. The check data block contained in request signal REQS is hereby formed by check-data-block generation means 12, taking account of first start value SV1, so check-data-block generation means 12 generates the first CRC checksum data block CRC1 and supplies it as a component of request signal REQS. The generated request signal REQS is then coded by coding means 14 and modulated by modulation means 16, so this signal is transmitted in the form of the modulated, coded request signal MCREQS to all transponders 2 present in the communication area of communication station 1, and received by each of transponders 2.

In the transponder 2 as shown in FIG. 2, the modulated, coded request signal MCREQS is received and then demodulated by demodulation means 33, and subsequently decoded by decoding means 41, so the received request signal REQS is subsequently available in transponder 2, specifically in the integrated circuit 4 of transponder 2. From the received request signal REQS, the "start of frame" data block and the "end of frame" data block are recognized by frame-data-block recognition means 43, and passed on to sequence control means 49 for control purposes. Further recognized from the received request signal REQS are the received "command" data block, by command-data-block recognition means 44, and the received "parameter" data block, by parameter-data-block recognition means 45, and the received first CRC checksum data block CRC 1, by the check-data-block recognition means. The recognized "command" data block and the recognized "parameter" data block are sent to sequence control means 49 for the purpose of further processing.

However, before an actual further processing of the "command" data block and the "parameter" data block takes place, the recognition of whether transponder 2 belongs to the first group GR1 of transponders 2 is checked. To this end, the "command" data block and "parameter" data block are sent to check-data-block generation means 47, to which the first start value SV1, stored in start-value memory means 40, is also sent by sequence control means 49. This has the result that check-data-block generation means 47 generates the first CRC checksum data block CRC1 in the manner already described above. The generated first CRC checksum data block CRC1 is sent to comparison means 48. The received first CRC checksum data block CRC1, recognized by check-data-block recognition means 46, is also sent to comparison means 48. Comparison means 48 undertakes a comparison of the two data blocks sent to it, wherein the comparison means establishes, in the case assumed here, that they are the same first CRC checksum data blocks CRC1. This has the result that comparison means 48 delivers the first control signal CS1, which first control signal CS1 is sent to sequence control means 49. This results in sequence control means 49 sanctioning the further processing of the "command" data block and the "parameter" data block, so these two data blocks are further processed and result in a corresponding sequence in transponder 2, specifically the integrated circuit 4 of transponder 2, e.g. a read sequence or a write sequence or a delete sequence, etc. As a further result, sequence control means 49 may, for example, activate the response-signal generation means 50, after which response-signal generation means 50 generates a response signal RS, which is transmitted to communication station 1.

If it had not been the first start value SV1 that was activated in transponder 2, specifically in integrated circuit 4 of transponder 2, but a different start value, e.g. one of the two start values SV2 and SV3, this would result in the second CRC checksum data block CRC2 or the third CRC checksum data block CRC3 being generated by check-data-block generation means 47 rather than first CRC checksum data block CRC1. This would result in comparison means 48 establishing dissimilarity of the CRC checksum data blocks sent to it, after which comparison means 48 would deliver the second control signal CS2. In sequence control means 49, the second control signal CS2 would result in it blocking a further processing of the received "command" data block, recognized by command-data-block recognition means 44, and the received "parameter" data block, recognized by parameter-data-block recognition means 45, which is desirable because transponder 2, specifically the integrated circuit 4 of transponder 2, belongs not to the first group GR1 of transponders 2, but to a different group of transponders 2, namely either to the second group GR2 of transponders 2 in accordance with the second start value SV2, or to the third group GR3 of transponders 2 in accordance with the third start value SV3.

It is apparent from the above description of the method that, with this method, for each group GR1, GR2, GR3, . . . GRn of transponders 2, a check data block (namely a CRC data block, which is always designated a CRC checksum data block above) CRC1, CRC2, CRC3, . . . CRCn that is significant for the group GR1, GR2, GR3, . . . GRn of transponders 2 is advantageously generated, both by check-data-block generation means 12 of communication station 1 and by the check-data-block generation means 47 of each transponder 2. It is further apparent from the above description of the method that the data that is evaluated for recognition of whether a transponder 2 belongs to a group GR1, GR2, GR3, . . . GRn of transponders 2 is data from the check data block CRC1, CRC2, CRC3, . . . CRCn that is significant for the group GR1, GR2, GR3, . . . GRn of transponders 2. In the case described here, this evaluation is made by comparison means 48 of transponder 2, to which comparison means 48 the check data block CRC1 generated in transponder 2 and the check data block CRC1 received by transponder 2 are sent for the purpose of comparison of these two check data blocks.

With the method described above, the great advantage is obtained that the data required for recognition of whether transponder 2 belongs to a group GR1, GR2, GP3, ... GRn of transponders 2 is formed by the data from the check data block CRC1, CRC2, CRC3, ... CRCn that is significant for the group GR1, GR2, GR3, ... GRn of transponders 2, which check data block CRC1, CRC2, CRC3, ... CRCn in any event has to be transmitted from communication station 1 to transponder 2 for security reasons, so that no additional data has to be transmitted from communication station 1 to transponder 2 in order to be able to undertake the recognition of whether transponder 2 belongs to a group GR1, GR2, GR3, ... GRn of transponders 2.

In the case of communication station 1 as shown in FIG. 1, only the first start value SV1 is stored in start-value memory means 13, so that communication station 1 can communicate only with transponders 2 that belong to the first group GR1 of transponders 2. If communication station 1 is to be able to communicate with transponders 2 belonging to the second group GR2 of transponders 2, the second start value SV2 must be stored and activated in the start-value memory means, so that the check-data-block generation means will generate the second CRC checksum data block CRC2. In the case of a communication station of this kind, it is also possible to store multiple start values in start-value memory means 13, and, in each case, to call up with sequence control means 8 a desired start value that belongs to a group of transponders 2, and to send it to check-data-block generation means 12.

In the case of transponder 2 as shown in FIG. 2, a total of three start values SV1, SV2 and SV3 are stored in start-value memory means 40. More than three start values may also be stored in start-value memory means 40. However, just one start value may also be stored in start-value memory means 40.

The method in accordance with the invention can be used not just with systems with a communication station 1 operating with contactless communication and with transponders 2 operating with contactless communication, but also with systems with a communication station 1 and transponders 2 that communicate with each other by means of contacts.

Transponders 2 may be tags or labels, as well as chip cards and transponders of a different physical design.

In the case of the method described above, which is implemented using communication station 1 in accordance with FIG. 1 and transponders 2 in accordance with FIG. 2, a start data block and an end data block are used. However, also just a start data block may be used. There is also the possibility of doing without so-called frame data blocks.

The invention claimed is:

1. A method of recognizing whether a transponder designed for communicating with a communication station belongs to one of at least two groups of transponders under which method the communication station designed for communicating with the transponder delivers a request signal to the transponder, which request signal comprises a command data block and a CRC check data block, and under which method, data contained in the request signal is evaluated in the transponder in order to recognize whether the transponder belongs to a group of transponders, wherein, for each group of transponders, a CRC check data block that is significant for the group of transponders is generated, and wherein the data that is evaluated for the recognition of whether the transponder belongs to a group of transponders is data from the CRC check data block that is significant for the group of transponders;

wherein the transponders process the command data block only if evaluation of the check data block of the request signal indicates that the transponder belongs to the group of transponders that is identified by the CRC check data block.

2. A communication station for communicating with a transponder, which transponder belongs to one of at least two groups of transponders, wherein the communication station contains means for implementing the method as claimed in claim 1.

3. A communication station as claimed in claim 2, wherein check-data-block generation means is provided and wherein the check-data-block generation means takes the form of CRC-data- block generation means, which CRC-data-block generation means interacts with start-value memory means, which is provided to store a group-significant start value, which group-significant start value is provided in order to influence the generation of the CRC check data block in the CRC-data-block generation means and wherein the start-value memory means is of programmable design and is designed for storing different group-significant start values, which different group-significant start values can be written to the start-value memory means and are responsible for the generation of different CRC check data blocks, of which different CRC check data blocks, each CRC check data block is significant for a group of transponders.

4. A circuit for a communication station for communicating with a transponder, which transponder belongs to one of at least two groups of transponders, wherein the circuit contains means for implementing the method as claimed in claim 1.

5. A circuit as claimed in claim 4, wherein check-data-block generation means is provided and wherein the check-data-block generation means takes the form of CRC-data-block generation means, which CRC-data-block generation means interacts with start-value memory means, which is provided to store a group-significant start value, which group-significant start value is provided in order to influence the generation of the CRC check data block in the CRC-data-block generation means, and wherein the start-value memory means is of programmable design and is designed for storing different group-significant start values that are each assigned to a different group of transponders, which different group-significant start values can be written to the start-value memory means and are responsible for the generation of different CRC data blocks, of which different CRC check data blocks, each CRC check data block is significant for a group of transponders.

6. A transponder for communicating with communication station, which transponder belongs to one of at least two groups of transponders, wherein the transponder contains means for implementing the method as claimed in claim 1.

7. A transponder as claimed in claim 6, wherein check-data-block generation means is provided and wherein the check-data-block generation means takes the form of CRC-data-block generation means, which CRC-data-block generation means interacts with start-value memory means, which is provided to store a group-significant start value, which group-significant start value is provided in order to influence the generation of the CRC check data block in the CRC-data-block generation means, and wherein the start-value memory means is of programmable design and is designed for storing different group-significant start values that are each assigned to a different group of transponders, which different group-significant start values can be written to the start-value memory means and are responsible for the generation of different CRC check data blocks, of which different CRC check data blocks, each CRC check data block is significant for a group of transponders.

8. A transponder as claimed in claim 7, wherein the start-value memory means is designed to store at least two different group-significant start values, and wherein means for sending one group-significant start value selected from the at least two group-significant start values to the CRC-data-block generation means are provided.

9. A circuit for a transponder for communicating with a communication station, which transponder belongs to one of at least two groups of transponders, wherein the circuit contains means for implementing the method as claimed in claim 1.

10. A circuit as claimed in claim 9, wherein check-data-block generation means is provided and wherein the check-data-block generation means takes the form of CRC-data-block generation means, which CRC-data-block generation means interacts with start-value memory means, which is provided to store a group-significant start value, which group-significant start value is provided in order to influence the generation of the CRC check data block in the CRC-data-block generation means, and wherein the start-value memory means is of programmable design and is designed for storing different group-significant start values that are each assigned to a different group of transponders, which different group-significant start values can be written to the start-value memory means and are responsible for the generation of different CRC check data blocks, of which different CRC check data blocks each CRC check data block is significant for a group of transponders.

11. A circuit as claimed in claim 10, wherein the start-value memory means is designed to store at least two different group-significant start values, and wherein means for sending one group-significant start value selected from the at least two group-significant start values to the CRC-data-block generation means are provided.

12. A method as claimed in claim 1, wherein the CRC check data block contains a set of error correction data that is used both for error correction at the transponder and to determine whether the transponder belongs to a particular group of transponders.

13. A circuit for a communication station for communicating with a transponder, which transponder belongs to one of at least two groups of transponders, wherein the circuit contains means for implementing a method for recognizing whether the transponder designed for communicating with the communication station belongs to one of at least two groups of transponders under which method the communication station designed for communicating with the transponder delivers a request signal to the transponder, which request signal comprises a command data block and a CRC check data block, and under which method, data contained in the request signal is evaluated in the transponder in order to recognize whether the transponder belongs to a group of transponders, wherein, for each group of transponders, a CRC check data block that is significant for the group of transponders is generated, and wherein the data that is evaluated for the recognition of whether the transponder belongs to a group of transponders is data from the CRC check data block that is significant for the group of transponders; and wherein check-data-block generation means is provided and wherein the check-data-block generation means takes the form of CRC-data-block generation means, which CRC-data-block generation means interacts with start-value memory means, which is provided to store a group-significant start value, which group-significant start value is provided in order to influence the generation of the CRC check data block in the CRC-data-block generation means, and wherein the start-value memory means is of programmable design and is designed for storing different group-significant start values that are each assigned to a different group of transponders, which different group-significant start values can be written to the start-value memory means and are responsible for the generation of different CRC check data blocks, of which different CRC check data blocks, each CRC check data block is significant for a group of transponders.

14. A circuit for a transponder for communicating with a communication station, which transponder belongs to one of at least two groups of transponders, wherein the circuit contains means for implementing a method for recognizing whether a transponder designed for communicating with a communication station belongs to one of at least two groups of transponders under which method the communication station designed for communicating with the transponder delivers a request signal to the transponder, which request signal comprises a command data block and a CRC check data block, and under which method, data contained in the request signal is evaluated in the transponder in order to recognize whether the transponder belongs to a group of transponders, wherein, for each group of transponders, a CRC check data block that is significant for the group of transponders is generated, and wherein the data that is evaluated for the recognition of whether the transponder belongs to a group of transponders is data from the CRC check data block that is significant for the group of transponders;

wherein check-data-block generation means is provided and wherein the check-data-block generation means takes the form of CRC-data-block generation means, which CRC-data-block generation means interacts with start-value memory means, which is provided to store a group-significant start value, which group-significant start value is provided in order to influence the generation of the CRC check data block in the CRC-data-block generation means, and wherein the start-value memory means is of programmable design and is designed for storing different group-significant start values that are each assigned to a different group of transponders, which different group-significant start values can be written to the start-value memory means and are responsible for the generation of different CRC check data blocks, of which different CRC check data blocks each CRC check data block is significant for a group of transponders.

15. A circuit as claimed in claim 14, wherein the start-value memory means is designed to store at least two different group-significant start values, and wherein means for sending one group-significant start value selected from the at least two group-significant start values to the CRC-data-block generation means are provided.

* * * * *